July 19, 1966 E. F. SULLIVAN 3,261,847
MANUFACTURE OF MALEIC ANHYDRIDE
Filed June 17, 1964
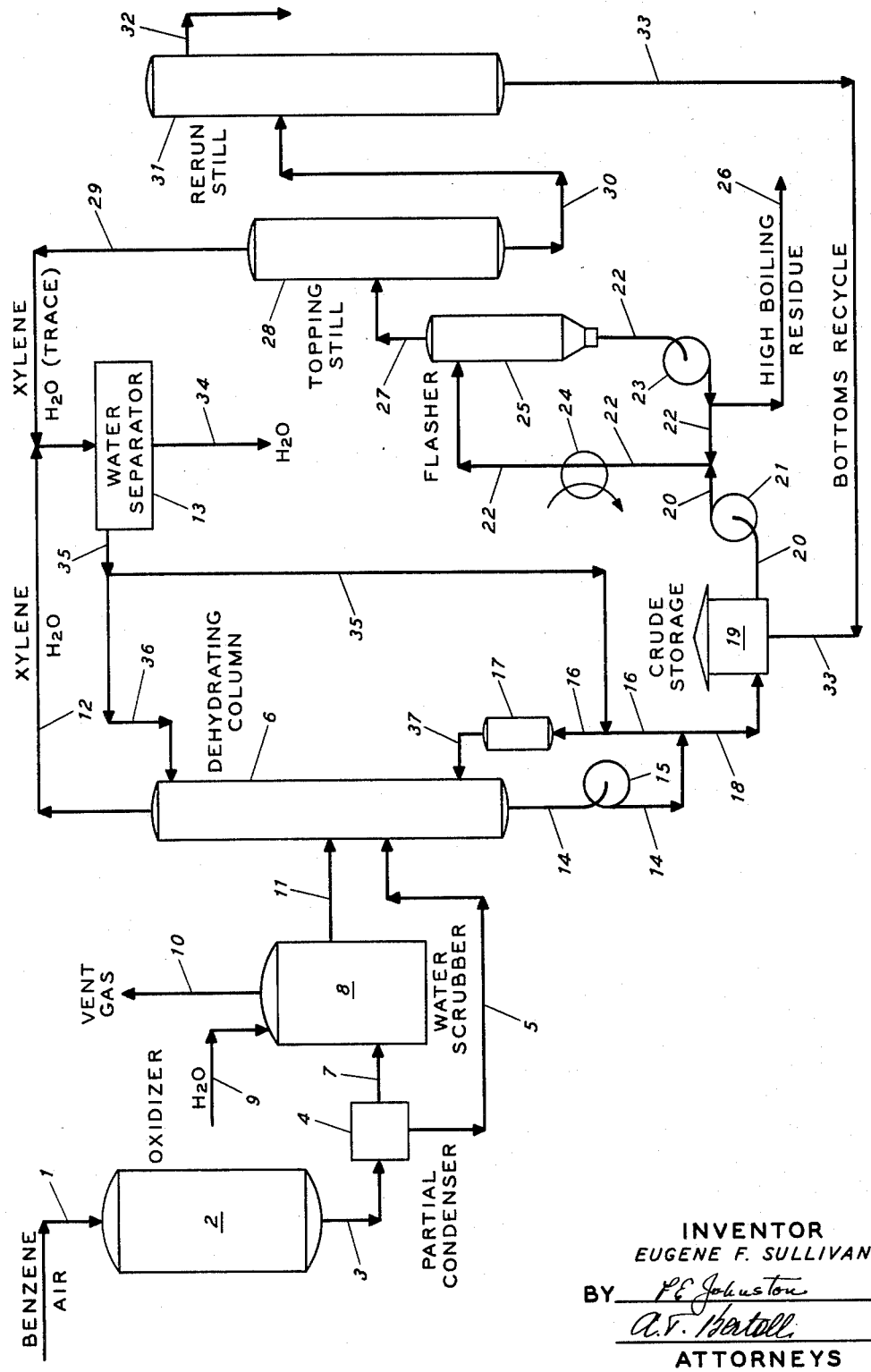
INVENTOR
EUGENE F. SULLIVAN
BY P.E. Johnston
A.V. Bertoll
ATTORNEYS 3,261,847
MANUFACTURE OF MALEIC ANHYDRIDE
Eugene F. Sullivan, Orinda, Calif., assignor to Chevron Research Company, a corporation of Delaware
Filed June 17, 1964, Ser. No. 375,896
4 Claims. (Cl. 260—346.8)

This is a continuation-in-part of application Ser. No. 117,080, filed June 14, 1961, now abandoned.

The present invention relates to the manufacture of maleic anhydride. More particularly, the invention has to do with a fully continuous process for the production of maleic anhydride by the catalytic partial oxidation of a suitable organic compound, such as benzene or toluene, and an oxygen-containing gas, such as air.

Numerous process and catalyst systems are suggested in the prior art for the preparation of maleic anhydride. In general, these involve contacting the vapor of a suitable organic compound with an oxygen-containing gas in the presence of a catalyst, the catalyst usually comprising as essential ingredients the oxides of vanadium and/or molybdeum. Temperatures of conversion are generally taught to range from 300° to 500° C. As organic feed it has been proposed to use an organic compound containing at least four carbon atoms, such as benzene, toluene, the cymenes, phenol, toluene, cyclopentadiene, furfural, and the like.

A typical commercial process involves passing the organic vapor, such as benzene or toluene vapor, and air, in proportions of 1 to 2 mol percent of organic compound over vanadia catalyst disposed in tubes arranged in a converter. The tubes are surrounded by a heat transfer liquid bath maintained at temperatures of about 350° to 500° C.

Following reaction, the hot gaseous effluent from the converter is treated to recover the maleic anhydride. Typically, a portion of the effluent is cooled to condense maleic anhydride which is sent to a crude maleic anhydride storage tank. The cooled gaseous stream from which part of the maleic anhydride has been condensed, and containing residual maleic anhydride vapor, is sent to a scrubbing zone, where it is contacted with the scrubbing liquid, usually water. The maleic anhydride entrained in the gaseous stream is extracted by the water, forming a maleic acid-water solution. The maleic acid-water solution is then sent to a dehydration zone for removal of water and conversion of maleic acid to maleic anhydride. The dehydration treatment is most advantageously carried out in the presence of an organic water-entraining agent, such as xylene or toluene, which, forming an azeotrope with the water, aids in its removal. The maleic acid-water solution in the dehydration zone is heated to an elevated temperature, and the water and azeotropic agent are separated from the maleic anhydride. The maleic anhydride recovered is sent to the crude maleic anhydride storage tank where it is combined with the condensed maleic anhydride previously obtained.

Customarily, the crude maleic anhydride obtained by partial condensation of effluent gases from the reaction zone and that obtained by dehydration are next subjected to a purification treatment involving the removal of remaining azeotropic agent and distillation of crude maleic anhydride.

While according to prior art practice, the manufacturing process including the steps of oxidation, scrubbing, and dehydration can be continuous, the subsequent purification of the maleic anhydride is performed by batch operation. That is, the crude stock is charged to a distillation zone in increments or batches, and each increment or batch is subjected to a complete distillation cycle before the next increment or batch is charged. The distillation cycle involves first, stripping out the low boiling forerun which consists mainly of the entraining agent and water; second, distilling overhead a heart cut of maleic anhydride; and third, removing the bottoms fraction containing all material boiling above the boiling point of maleic anhydride. The next batch of crude maleic anhydride is then charged and the process repeated.

In accordance with the present invention, it is proposed to purify the crude maleic anhydride obtained by condensation and dehydration by continuous operation, as opposed to batch operation. The invention makes it possible to integrate the purification treatment with the other steps of the process, thus providing a fully continuous operation from start to finish.

The purification treatment involves a flash distillation to remove as bottoms all material having a boiling point greater than maleic anhydride; a topping distillation to remove the stripping agent, any residual water, and any other low boiling material; and distillation of maleic anhydride taken as an overhead product, the bottoms, if desired being recycled to crude storage to be reused as part of the feed to the flash distillation step. In these various distillations all the stills operate in a continuous manner. Thus, crude maleic anhydride from the crude storage tank is continuously fed to the flasher. The overhead from the flasher is continuously removed and passed into the topping still. The bottom of the topping still are continuously removed and fed to the maleic anhydride distillation column, and the distilled maleic anhydride is continuously removed as a product.

More particularly, the total effluent after the oxidation reaction above described is passed through a cooling zone, wherein a portion, such as 30 to 60% of the maleic anhydride contained in the effluent is condensed as a liquid phase at condensing temperatures, for example, 130° F. to 150° F.

The effluent, from which a portion of th maleic anhydride has been condensed, is passed into a scrubbing zone and contacted with water to remove the residual maleic anhydride in the effluent and form a maleic acid-water solution. The maleic acid-water solution is removed from the scrubbing zone at a rate such as to maintain the maleic acid concentration of the solution in about the range of 25 to 50 percent by weight. This solution is then passed into a dehydration column at an intermediate position between the top and bottom, i.e., at about the middle of the column.

The condensed liquid from the condensation zone is also passed into the dehydration column at a point below the entry of the maleic acid-water solution, i.e., at a point about half-way between the bottom of the column and the introduction of the maleic acid-water solution.

In the dehydration column the maleic acid-water solution is subjected to dehydration conditions to remove water of solution and of hydration to produce maleic anhydride, suitable conditions being like those shown in U.S. Patent 2,683,110. That is, the dehydration column contains a body of an organic water-insoluble liquid, which is chemically inert under the conditions of dehydration, and which is capable of forming an azeotropic mixture with the water.

Water and organic liquid, such as toluene or xylene, are azeotropically distilled overhead from the distillation column, and the organic liquid separated from the water. Instead of returning the separated organic liquid to the top portion of the dehydrating column, in accordance with the present invention only a minor proportion, sufficient to provide reflux, is returned to the top portion of the column. The major proportion of the organic azeotrope is returned to the bottom or lower portion of the dehydrating column, and as shown below, is conveniently introduced along with recycled maleic anhydride heated to supply the heat of vaporization required in the column.

Maleic anhydride is removed from the base or bottom portion of the column.

The maleic anhydride withdrawn from the dehydration column, being relatively free of water but containing some xylene, is then further treated to purify it, as hereinabove indicated. That is, it is flashed to remove high boiling acids and tars as a bottoms fraction. The overhead is distilled to remove residual xylene and the xylene-free material is then subjected to a final distillation purification treatment.

To illustrate the practice and advantages of the invention, the following examples are given with reference to the drawing which is a block-flow diagram, showing the oxidation, dehydration, and purification sections involved in preparing maleic anhydride in accordance with the invention.

*Example 1*

Benzene, 2,440 pounds per hour, with 74,246 pounds per hour of moist air, is introduced through line 1 into oxidizer 2. The mixture is oxidized in the presence of a suitable catalyst, for example, vanadium pentoxide on a suitable support, at a temperature in the range 700° to 800° F. Following oxidation, the gaseous effluent, 76,686 pounds per hour, flows from oxidizer 2 through line 3 into partial condenser 4. In condenser 4 about half of the maleic anhydride contained in the gaseous effluent, 1,092 pounds per hour, is condensed. This partial condensate having a temperature of about 140° F. is then introduced through line 5 into the lower bottom portion of dehydrating column 6. Uncondensed gaseous material, 75,594 pounds per hour, containing maleic anhydride, from condenser 4 is passed through line 7 into water scrubber 8, wherein it is contacted with a body of water maintained at about 110–120° F., and a maleic acid-water solution is formed. Make-up water is added through line 9 at the rate of 3,064 pounds per hour. Vent gases, 75,439 pounds per hour, free of maleic anhydride, leave through line 10.

Maleic acid-water solution, 3,219 pounds per hour, is withdrawn from scrubber 8 through line 11 and charged to dehydrating column 6 provided with azeotroping agent such as xylene.

As indicated in the drawing, the water solution enters at approximately the middle of the dehydration column, while the partial condensate is introduced thereinto at a point intermediate the entry of the aqueous solution and the bottom or base of the column. For example, in a 27-plate column, the water solution enters at the twelfth plate, and the partial condensate, at the sixth plate.

Column 6 is operated at an overhead temperature of about 245° F. and a bottoms temperature of about 374° F. Water is removed as a water-xylene azeotrope through line 12, and passed to water separator 13.

Following the dehydration treatment in column 6, crude maleic anhydride is withdrawn through line 14. A portion of the withdrawn maleic anhydride is sent by means of pump 15 through line 16 into reboiler 17 wherein it is heated and then passed through line 37 into the column to supply the heat of distillation required therein. Another portion, 2,230 pounds per hour, is sent through line 18 into crude storage tank 19. Crude storage tank 19 is provided with heating means, not shown, to effect a temperature sufficiently high to maintain the product in the liquid state, a temperature of around 260° F. being satisfactory.

Crude maleic anhydride, 2,604 pounds per hour, is withdrawn from crude storage tank 19 through line 20. By means of pump 21 it is passed into pump-around loop 22, provided with a pump 23, and heat exchanger 24, into flasher 25. The flasher is operated at reduced pressure, for example, 120 mm. Hg and at a temperature of about 318° F. Undesirable high boiling material, 233 pounds per hour, is removed from pump-around loop 22 through line 26.

The distillate from the flasher, 2,371 pounds per hour, leaves through line 27 and passes into topping still 28, operated at reduced pressure, for example, 50 mm. Hg and at a bottoms temperature of about 300° F. Xylene, 46 pounds per hour, containing a trace of water is taken overhead through line 29. Maleic anhydride, 2,325 pounds per hour, is removed through line 30, and passed into re-run still 31 for further purification. This still is operated at reduced pressure, for example, 50 mm. Hg and at an overhead temperature of 245° F. The distilled maleic anhydride product, 1,951 pounds per hour, representing a yield of 63.7 mol percent based on benzene, is removed through line 32. The bottoms from the distillation, 374 pounds per hour, are recycled through line 33 to crude storage tank 19.

Xylene overhead from topping still 28 is passed through line 29 into water separator 13, wherein it is combined with the xylene-water azeotrope from dehydrating column 6. In separator 13 water, 2,127 pounds per hour, is separated from the xylene and withdrawn through line 34. The water-free xylene is withdrawn through line 35. A minor proportion sufficient to provide reflux is passed through line 36 to the upper portion of the column, while a major proportion is fed to the bottom portion of the column, preferably through line 16, reboiler 17, and line 37. Make-up xylene, by means not shown, may also be supplied at this point.

*Example 2*

The oxidizer, partial condenser, and water scrubber are operated as in Example 1, except that the partial condensate, 1,092 pounds per hour, instead of first being charged to dehydrating column 6, is passed directly to the crude storage tank 19 from condenser 4.

Maleic anhydride from the dehydrating column, 1,139 pounds per hour, is combined with the partial condensate in the crude storage tank. The combined crude maleic anhydride, 2,605 pounds per hour, is withdrawn from the storage tank and pumped into the pump-around loop 22, through the heat exchanger 24 and finally into the flasher 25. The overhead from the flasher, 2,202 pounds per hour, is charged to the topping still 28. The bottoms, 403 pounds per hour, are removed through line 26.

In the topping still xylene, 23 pounds per hour, is taken overhead and is charged directly to the upper portion of the dehydration column. The bottoms, 2,179 pounds per hour, are charged to the re-run still 31. In the re-run still maleic anhydride product, 1,805 pounds per hour, representing a 58.9 mol percent, is taken overhead; and the bottoms, 374 pounds per hour, are recycled to the crude storage tank 19.

Comparing Example 2 with Example 1, the yield of desirable maleic anhydride is lower (58.9% per hour as compared with 63.7% per hour), while the production of undesirable high boiling materials through line 26 is greater (403 pounds per hour as compared with 233 pounds per hour).

It was also noted that continuous operation according to Example 2 could not be conducted for long. Plant shutdowns were frequently necessitated due to extensive plugging in lines 20, 22, and 26; in pumps 21 and 23; in heat exchanger 24; in the flasher 25; and in dehydration column 6. Surprisingly, plugging and plant shutdowns were eliminated when the procedure of Example 1 was followed.

I claim:
1. Continuous process for the manufacture of maleic anhydride, in which a hydrocarbon selected from the group consisting of benzene and toluene is catalytically oxidized in vapor phase with air in a reaction zone to produce a maleic anhydride effluent, which comprises passing the effluent through a cooling zone, and there condensing and separating as a liquid phase a portion of the maleic anhydride content of the effluent, passing the uncondensed portion of the effluent into a scrubbing zone and there contacting it with water to remove the residual maleic anhydride content of the effluent and convert it to maleic acid in water solution, withdrawing maleic acid-water solution from the scrubbing zone at a rate such as to maintain the maleic acid concentration of the solution in the range about 25 to about 50 percent by weight, passing the withdrawn maleic acid-water solution into the intermediate portion of a dehydration column, passing the condensed liquid maleic anhydride into the lower portion of said dehydration column, said dehydration column containing an organic liquid capable of forming an azeotropic mixture with water, distilling the water and said organic liquid, as an azeotropic mixture, separating the organic liquid from the water, returning a major proportion of the organic liquid to the lower portion of the distillation column, and a minor proportion to provide reflux to the upper portion of the column, withdrawing maleic anhydride from the lower portion of the dehydration column, and continuously subjecting it to distillation to purify it.

2. Process according to claim 1, wherein the hydrocarbon to be catalytically oxidized is benzene.

3. Process according to claim 1, wherein the organic liquid is xylene.

4. Process according to claim 3, wherein the hydrocarbon to be catalytically oxidized is benzene.

References Cited by the Examiner

UNITED STATES PATENTS 2,683,110    7/1954    Rousseau _____ 260—346.8

FOREIGN PATENTS 633,814    8/1947    Great Britain.

OTHER REFERENCES

Kirk-Ohtmer, Editors, Encyclopedia of Chemical Technology, vol. 8 (1952), pages 690–91.

HENRY R. JILES, *Acting Primary Examiner.*

NICHOLAS S. RIZZO, *Assistant Examiner.*